US012177099B2

(12) United States Patent
Kondapalli et al.

(10) Patent No.: US 12,177,099 B2
(45) Date of Patent: Dec. 24, 2024

(54) TECHNOLOGIES FOR CAPTURING PROCESSING RESOURCE METRICS AS A FUNCTION OF TIME

(71) Applicant: Intel Corporation, Santa Clara, CA (US)

(72) Inventors: Raghu Kondapalli, San Jose, CA (US); Alexander Bachmutsky, Sunnyvale, CA (US); Francesc Guim Bernat, Barcelona (ES); Ned M. Smith, Beaverton, OR (US); Trevor Cooper, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 17/579,382

(22) Filed: Jan. 19, 2022

(65) Prior Publication Data

US 2022/0224614 A1    Jul. 14, 2022

Related U.S. Application Data

(63) Continuation of application No. 16/369,426, filed on Mar. 29, 2019, now Pat. No. 11,265,235.

(51) Int. Cl.
*H04L 43/067* (2022.01)
*H04L 43/028* (2022.01)
*H04L 43/065* (2022.01)

(52) U.S. Cl.
CPC .......... *H04L 43/067* (2013.01); *H04L 43/028* (2013.01); *H04L 43/065* (2013.01)

(58) Field of Classification Search
CPC ..... H04L 43/02; H04L 43/022; H04L 43/024; H04L 43/028; H04L 43/065; H04L 43/067; H04L 43/08
See application file for complete search history.

(56) References Cited

U.S. PATENT DOCUMENTS 8,018,866 B1    9/2011 Kasturi et al.
8,045,475 B2 *  10/2011 Mohan ............... H04L 43/0864
                                              370/241

(Continued)

FOREIGN PATENT DOCUMENTS

EP        3432520 A1    1/2019

OTHER PUBLICATIONS

Hong et al., "Resource Management in Fog/Edge Computing: A Survey," Sep. 30, 2018, 22 pages.

(Continued)

*Primary Examiner* — Kostas J Katsikis
(74) *Attorney, Agent, or Firm* — Hanley, Flight & Zimmerman, LLC (57) ABSTRACT

Technologies for collecting metrics associated with a processing resource (e.g., central processing unit (CPU) resources, accelerator device resources, and the like) over a time window are disclosed. According to an embodiment presented herein, a network device receives, in an edge network, a request to provide one or more metrics associated with a processing resource, the request specifying a window indicative of a time period to capture the one or more metrics. The network device obtains the one or more metrics from the processing resource for the specified window and provides the obtained one or more metrics in response to the request.

26 Claims, 5 Drawing Sheets

(56) References Cited

U.S. PATENT DOCUMENTS

| | | | |
|---|---|---|---|
| 9,280,386 B1* | 3/2016 | Hagmann | G06F 9/5038 |
| 9,521,053 B1* | 12/2016 | Chen | H04L 12/4641 |
| 9,584,395 B1* | 2/2017 | Rapoport | G06F 11/0709 |
| 9,722,934 B2 | 8/2017 | Muniraju | |
| 9,935,829 B1 | 4/2018 | Miller et al. | |
| 10,225,155 B2 | 3/2019 | Manning et al. | |
| 10,476,766 B1 | 11/2019 | Rodriguez | |
| 10,505,875 B1* | 12/2019 | Jenks | H04L 51/02 |
| 10,574,670 B1 | 2/2020 | Verma et al. | |
| 10,630,598 B1 | 4/2020 | Kowalski | |
| 10,761,893 B1* | 9/2020 | Bhadauria | G06F 9/5044 |
| 10,791,168 B1 | 9/2020 | Dilley et al. | |
| 10,819,584 B2 | 10/2020 | Li et al. | |
| 11,108,687 B1* | 8/2021 | Hawkins | H04L 45/38 |
| 11,119,800 B1* | 9/2021 | Kowalski | G06F 11/3409 |
| 11,265,235 B2 | 3/2022 | Kondapalli et al. | |
| 2004/0103076 A1 | 5/2004 | Casati et al. | |
| 2005/0065753 A1 | 3/2005 | Bigus et al. | |
| 2006/0010389 A1 | 1/2006 | Rooney et al. | |
| 2007/0041329 A1 | 2/2007 | Schine | |
| 2013/0030761 A1 | 1/2013 | Lakshminarayan et al. | |
| 2013/0110761 A1 | 5/2013 | Viswanathan et al. | |
| 2013/0132001 A1 | 5/2013 | Yacout et al. | |
| 2013/0290047 A1 | 10/2013 | Bash et al. | |
| 2014/0351412 A1 | 11/2014 | Elisha | |
| 2015/0074267 A1 | 3/2015 | Manning et al. | |
| 2015/0200862 A1 | 7/2015 | Muniraju | |
| 2018/0052759 A1* | 2/2018 | Giral | G06F 11/3409 |
| 2018/0082449 A1 | 3/2018 | Poduri et al. | |
| 2018/0121529 A1* | 5/2018 | Asadi | G06F 16/2471 |
| 2018/0241649 A1 | 8/2018 | Mazzitelli | |
| 2018/0288083 A1 | 10/2018 | Yermakov | |
| 2018/0309636 A1 | 10/2018 | Strom et al. | |
| 2019/0026349 A1 | 1/2019 | Reilly | |
| 2019/0042297 A1 | 2/2019 | Connor et al. | |
| 2019/0052597 A1 | 2/2019 | Raghunath et al. | |
| 2019/0342181 A1 | 11/2019 | Li et al. | |
| 2019/0384662 A1* | 12/2019 | Bonnell | G06F 11/3072 |
| 2020/0053173 A1* | 2/2020 | Dasgupta | H04L 43/028 |
| 2020/0076715 A1 | 3/2020 | Kondapalli et al. | |
| 2020/0092159 A1 | 3/2020 | Thampy et al. | |
| 2020/0162336 A1* | 5/2020 | Gonguet | H04L 41/0893 |
| 2020/0252789 A1 | 8/2020 | Zheng et al. | |
| 2020/0287923 A1* | 9/2020 | Raghavendra | G06N 5/022 |

OTHER PUBLICATIONS

Caraguay, et al., MDPI SENSORS, "Monitoring and Discovery for Self-Organized Network Management in Virtualized and Software Defined Networks," Department of Software Engineering and Artificial Intelligence (DISIA) Mar. 31, 2017, 31 pages.

Taherizadeh et al., "Monitoring self-adaptive applications within edge computing frameworks: A state-of-the-art review," Journal of Systems and Software, Feb. 2018, 21 pages.

Liu et al., "Dynamic Task Offloading and Resource Allocation for Ultra-Reliable Low-Latency Edge Computing," IEEE Transactions on Communications, Jun. 2019, 38 pages.

United States Patent and Trademark Office, "Non-Final Office Action," issued in connection with U.S. Appl. No. 16/369,426 on Jul. 24, 2020, 25 pages.

United States Patent and Trademark Office, "Non-Final Office Action," issued in connection with U.S. Appl. No. 16/369,426 on Nov. 20, 2020, 18 pages.

United States Patent and Trademark Office, "Final Office Action," issued in connection with U.S. Appl. No. 16/369,426 on Mar. 9, 2021, 34 pages.

United States Patent and Trademark Office, "Notice of Allowance and Fee(s) Due," issued in connection with U.S. Appl. No. 16/369,426 on Jun. 21, 2021, 6 pages.

United States Patent and Trademark Office, "Notice of Allowance and Fee(s) Due," issued in connection with U.S. Appl. No. 16/369,426 on Oct. 14, 2021, 6 pages.

* cited by examiner

TECHNOLOGIES FOR CAPTURING PROCESSING RESOURCE METRICS AS A FUNCTION OF TIME

RELATED APPLICATION

This patent arises from a continuation of U.S. patent application Ser. No. 16/369,426, (now U.S. Pat. No. 11,265, 235) which was filed on Mar. 29, 2019. U.S. patent application Ser. No. 16/369,426 is hereby incorporated herein by reference in its entirety. Priority to U.S. patent application Ser. No. 16/369,426 is hereby claimed.

BACKGROUND

Edge computing provides techniques for processing resources at a location in closer network proximity to a requesting device, as opposed to a centralized location in a cloud network. Doing so ensures that devices receive critical data relatively quickly. Further, service providers within an edge network may provide services accessible by edge devices for various applications. The services may be received at a network device in an edge location. The network device may include a load balancer to distribute requests to an appropriate compute device based on several parameters, such as a service level agreement (SLA) and a status of processing resources in the edge location. Doing so can ensure efficient usage of resources in the edge network and that a given SLA is satisfied.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. Furthermore, the disclosed embodiments may be initially encoded as a set of preliminary instructions (e.g., encoded on a machine-readable storage medium) that may require preliminary processing operations to prepare the instructions for execution on a destination device. The preliminary processing may include combining the instructions with data present on a device, translating the instructions to a different format, performing compression, decompression, encryption, and/or decryption, combining multiple files that include different sections of the instructions, integrating the instructions with other code present on a device, such as a library, an operating system, etc., or similar operations. The preliminary processing may be performed by the source compute device (e.g., the device that is to send the instructions), the destination compute device (e.g., the device that is to execute the instructions), or an intermediary device. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Figure 1:
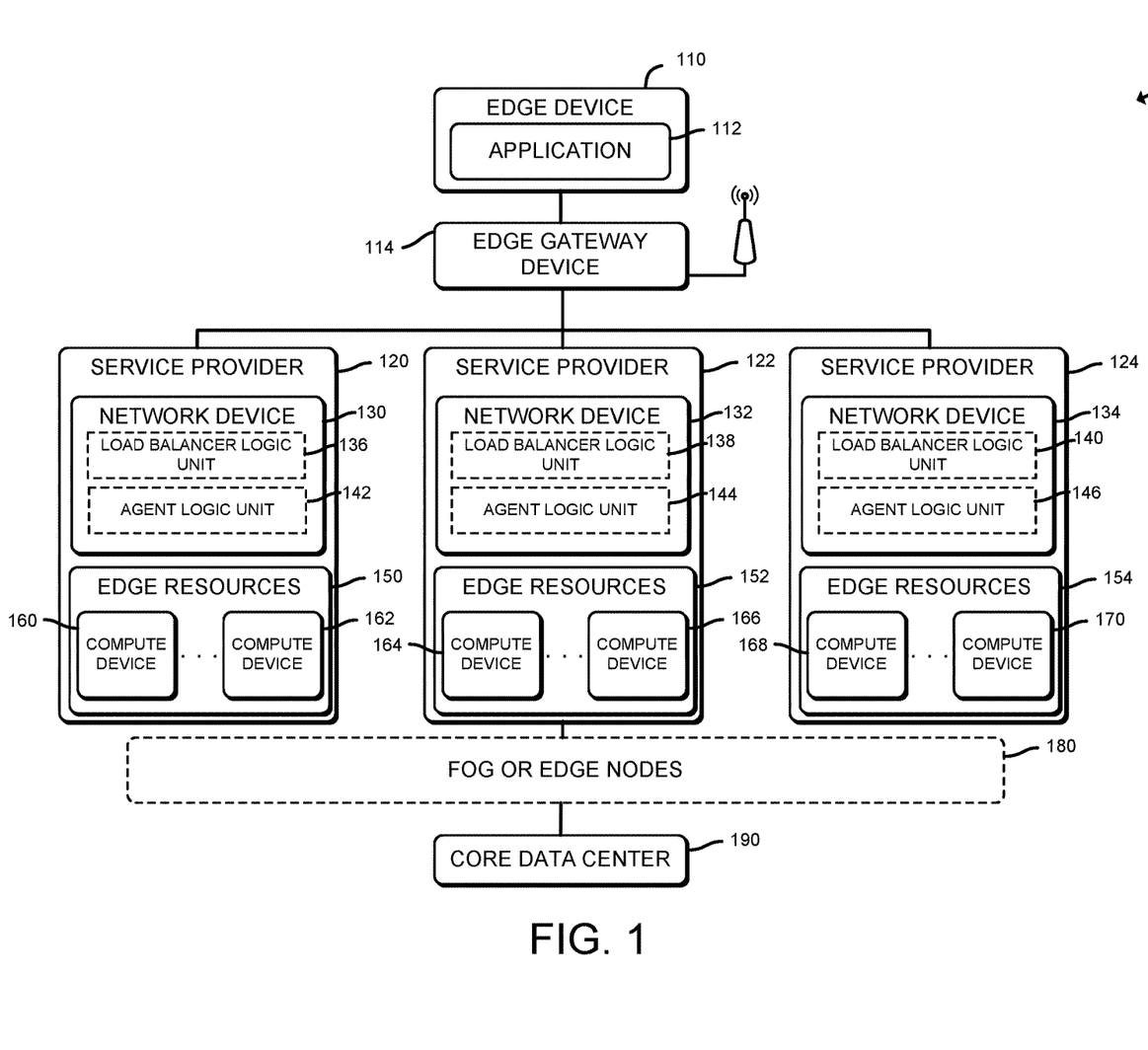
FIG. 1 is a simplified diagram of at least one embodiment of a system for collecting and distributing metrics associated with a processing resource as a function of time.

Referring now to FIG. 1, a system 100 for collecting and distributing metrics is shown. Illustratively, the system 100 includes an edge device 110 in communication with an edge gateway device 114. The edge gateway device 114 may be embodied as any device capable of communicating data between the edge device 110 and one or more edge resources 150, 152, 154 (e.g., resources, such as compute devices and the components thereof, owned and/or operated by one or more service providers 120, 122, 124, respectively, such as cellular network operators) or other compute devices located in a cloud. Further, the edge gateway device 114, in the illustrative embodiment, is configured to receive and respond to requests from the edge device 110 regarding characteristics of the edge resources 150, 152, 154, such as architectures of processors, accelerator devices, and/or other components in the edge resources 150, 152, 154 (e.g., in compute devices 160, 162, 164, 166, 168, 170), latencies, power usage, and costs (e.g., monetary costs) associated with utilizing those edge resources 150, 152, 154. The edge gateway device 114 and the edge resources 150, 152, 154, in the illustrative embodiment, are positioned at one or more locations (e.g., in small cell(s), base station(s), etc.) along the edge (e.g., in an edge network) of a cloud.

An edge network may be embodied as any type of network that provides edge computing and/or storage resources which are proximately located to radio access network (RAN) capable endpoint devices (e.g., mobile computing devices, Internet of Things (IoT) devices, smart devices, etc.). In other words, the edge network is located at an "edge" between the endpoint devices and traditional mobile network access points that serves as an ingress point into service provider core networks, including carrier networks (e.g., Global System for Mobile Communications (GSM) networks, Long-Term Evolution (LTE) networks, 5G networks, etc.), while also providing storage and/or compute capabilities. Accordingly, the edge network can provide a radio access interface to enterprise applications (e.g., housed in a remote cloud, data center, etc.) and/or other network-based services, as well as bring storage/compute resources closer to the endpoint devices. As some computations/processing can be performed at the edge networks, efficiencies such as reduced latency, bandwidth, etc., can be realized (i.e., relative to such computations/processing being performed at a remote cloud, data center, etc.). Depending on the intended purpose/capabilities of the edge network, the edge network may include one or more edge computing devices, which may include one or more gateways, servers, mobile edge computing (MEC) appliances, etc. Further, the system 100 may be organized in a hierarchical structure having multiple tiers. For example, a given tier may include the aforementioned edge computing devices, e.g., edge computing devices in locations that are of a similar network proximity to the edge device 110. A next tier may include cell towers and base stations providing edge resources. The following tier may include a central office station in a core data center 190.

It should be appreciated that, in some embodiments, the edge network may form a portion of or otherwise provide an ingress point into a fog network (e.g., fog or edge nodes 180), which may be embodied as a system-level horizontal architecture that distributes resources and services of computing, storage, control and networking anywhere between a core data center 190 (e.g., a data center that is further away from and in a higher level of the hierarchy of the system 100 than the edge resources 150, 152, 154, and that includes multiple compute devices capable of executing one or more services (e.g., processes on behalf of one or more clients)) and an endpoint device (e.g., the edge device 110).

In an embodiment, the edge device 110 executes an application 112 (e.g., using a processor and/or accelerator device(s)) included therein. The application 112 may include one or more services or workloads for processing. For example, assume that the edge device 110 is representative of an autonomous vehicle connected to the edge network forming the system 100. The application 112 may include various functions for ensuring normal operation of the autonomous vehicle, such as location, navigation, and other functions used to operate the vehicle. Further, the application 112 may request data from services provided by edge resources 150, 152, or 154. Generally, the edge gateway device 114 may receive such requests. The edge gateway device 114 may thereafter evaluate the request and forward the request to an appropriate service at an edge location operated by one of the service providers 120, 122, 124 (or to the fog or edge nodes 180 or core data center 190).

Illustratively, network devices 130, 132, 134 are also provided within a set of service providers 120, 122, 124 to perform switching and load balancing functions for requests directed to the edge resources 150, 152, 144. More particularly, the network device 130, 132, 134 may determine which of the respective compute devices of the edge resources 150, 152, 154 should service the request according to one or more policies (such as a service level agreement (SLA), load balancing policy, QoS requirements, a combination of each the aforementioned policies, etc.). The network device 130, 132, 134 then transmits the request to a selected compute device for processing. In some embodiments, the network device 130, 132, 134 includes a load balancer logic unit 136, 138, 140 (respectively), which may be embodied as any device or circuitry to carry out load balancing tasks on behalf of the service provider.

The policies used in selecting an appropriate compute device may account for current usage and availability of the edge resources 150, 152, 154. Consequently, obtaining usage metrics of processing resources (e.g., compute resources, accelerator resources, and the like) of the edge resources 150, 152, 154 allows the network devices 130, 132, 134 to determine which processing resources are suited to handle the request. Metrics associated with processing resources may include information about current processing load, availability of resources (e.g., available cores of a processor), caches associated with the processing resource (e.g., cache hits or misses, whether the cache is "hot" or "cold" relative to when the cache was last accessed and whether the data to be accessed is currently in the cache, etc.), a size of a request queue, a time-to-live metric, a throughput, a bandwidth, and so on. For the load balancing logic 136, 138, 140 to efficiently distribute processing and service requests to the edge resources, it is important that the metrics obtained are relatively up-to-date. For example, assume that a processing task is subject to a 1 KB per second data processing requirement by a CPU core (e.g., according to a SLA). The load balancer may evaluate usage metrics of compute devices in the edge resources to determine which of the compute devices is capable of servicing a processing task request to satisfy the requirement. Therefore, it is desirable to obtain relevant and up-to-date metrics to determine a destination edge resource to service the request.

As further described herein, embodiments disclose techniques for collecting and distributing metrics associated with processing resources using a time window. In an embodiment, each network device 130, 132, 134 includes an agent logic unit 142, 144, 146 (respectively), which may be embodied as any device or circuitry to collect metrics from compute devices (e.g., the compute devices 160, 162, 164, 166, 168, 170) according to a time window (e.g., specified by the load balancer on the network device). More particularly, the time window is indicative of a period of time in which the metrics are to be exposed by the edge resources. The agent logic unit 142, 144, 146 may cause the compute devices to activate performance counters within the given time window, during which the agent logic unit 142, 144, 146 collects usage metrics. Doing so allows the load balancing unit to evaluate metrics that are relevant in assigning a processing task to a given edge resource. For example, given a processing task that involves a deadline to complete, the load balancer may send a request to the agent for usage metrics, in which the request includes a time window indicative of the deadline. In turn, the agent logic unit 142, 144, 146 may determine relevant metrics (e.g., based on a usage context of load balancing the processing task request) to observe within that time window and cause the compute devices to expose those metrics within the time window. Advantageously, the load balancer may evaluate the metrics to identify compute devices available to service the request within the specified deadline.

Figure 2:
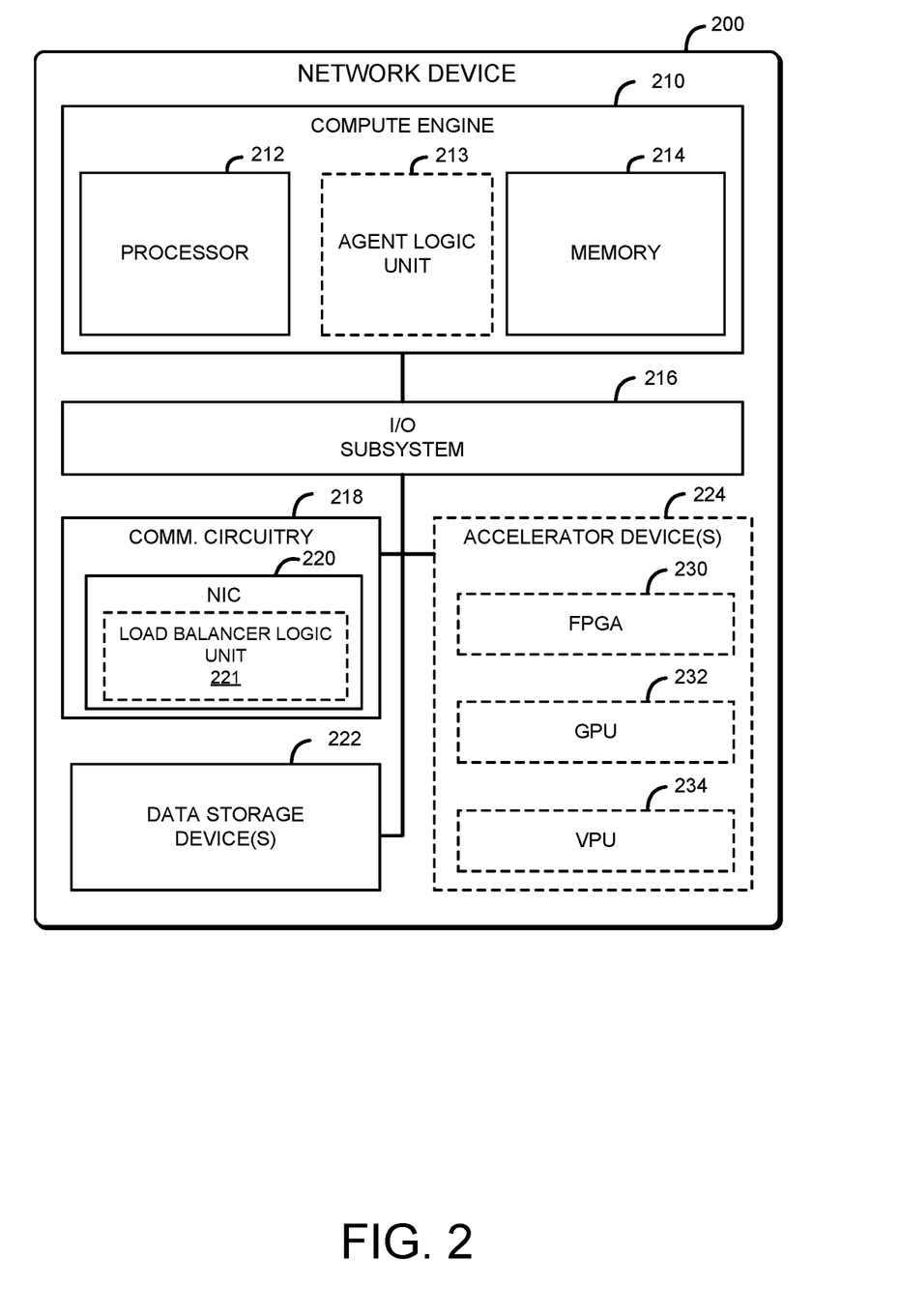
FIG. 2 is a simplified block diagram of at least one embodiment of a network device that may be included with the system described relative to FIG. 1.

Referring now to FIG. 2, a simplified block diagram of a network device 200 is shown. The network device 200 is representative of any of the network devices 130, 132, 134 described relative to FIG. 1. The network device 200 may be embodied as one or more physical compute devices or a virtualized system (e.g., one or more functions executed in virtualized environment(s), such as virtual machine(s) or container(s), in which the underlying hardware resources appear as physical hardware to software executing in the virtualized environment(s), but are separated from the software by an abstraction layer). Further, the illustrative network device 200 includes a compute engine (also referred to herein as "compute engine circuitry") 212, an input/output (I/O) subsystem 216, communication circuitry 218, and one or more data storage devices 222. As described herein, the network device 200 may also include one or more accelerator devices 224. Of course, in other embodiments, the network device 200 may include other or additional components, such as those commonly found in a computer (e.g., a display, peripheral devices, etc.). Additionally, in some embodiments, one or more of the illustrative components may be incorporated in, or otherwise form a portion of, another component. The compute engine 210 may be embodied as any type of device or collection of devices capable of performing various compute functions described below. In some embodiments, the compute engine 210 may be embodied as a single device such as an integrated circuit, an embedded system, a field-programmable gate array (FPGA), a system-on-a-chip (SOC), or other integrated system or device. In the illustrative embodiment, the compute engine 210 includes or is embodied as a processor 212 and a memory 214. The compute engine 210 may also include an agent logic unit 213, which is representative of the agent logic unit 142, 144, 146 described relative to FIG. 1. The processor 212 may be embodied as any type of processor capable of performing the functions described herein (e.g., processing service requests to edge resources of an edge device 110). For example, the processor 212 may be embodied as a multi-core processor(s), a microcontroller, or other processor or processing/controlling circuit. In some embodiments, the processor 212 may be embodied as, include, or be coupled to an FPGA, an application specific integrated circuit (ASIC), reconfigurable hardware or hardware circuitry, other specialized hardware, or a virtualized version thereof, etc., to facilitate performance of the functions described herein.

The memory 214 may be embodied as any type of volatile (e.g., dynamic random access memory (DRAM), etc.) or non-volatile memory or data storage capable of performing the functions described herein. Volatile memory may be a storage medium that requires power to maintain the state of data stored by the medium. Non-limiting examples of volatile memory may include various types of random access memory (RAM), such as dynamic random access memory (DRAM) or static random access memory (SRAM). One particular type of DRAM that may be used in a memory module is synchronous dynamic random access memory (SDRAM). In particular embodiments, DRAM of a memory component may comply with a standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4. Such standards (and similar standards) may be referred to as DDR-based standards and communication interfaces of the storage devices that implement such standards may be referred to as DDR-based interfaces.

In one embodiment, the memory device is a block addressable memory device, such as those based on NAND or NOR technologies. A memory device may also include a three dimensional crosspoint memory device (e.g., Intel 3D XPoint™ memory), or other byte addressable write-in-place nonvolatile memory devices. In one embodiment, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory. The memory device may refer to the die itself and/or to a packaged memory product.

In some embodiments, 3D crosspoint memory (e.g., Intel 3D XPoint™ memory) may comprise a transistor-less stackable cross point architecture in which memory cells sit at the intersection of word lines and bit lines and are individually addressable and in which bit storage is based on a change in bulk resistance. In some embodiments, all or a portion of the memory 214 may be integrated into the processor 212. In operation, the memory 214 may store various software and data used during operation such as one or more applications, data operated on by the application(s), libraries, and drivers.

The compute engine 210 is communicatively coupled to other components of the network device 200 via the I/O subsystem 216, which may be embodied as circuitry and/or components to facilitate input/output operations with the compute engine 210 (e.g., with the processor 212, agent logic unit 213, and/or the memory 214) and other components of the network device 200. For example, the I/O subsystem 216 may be embodied as, or otherwise include, memory controller hubs, input/output control hubs, integrated sensor hubs, firmware devices, communication links (e.g., point-to-point links, bus links, wires, cables, light guides, printed circuit board traces, etc.), and/or other components and subsystems to facilitate the input/output operations. In some embodiments, the I/O subsystem 216 may form a portion of a system-on-a-chip (SoC) and be incorporated, along with one or more of the processor 212, the agent logic unit 213, the memory 214, and other components of the network device 200, into the compute engine 210.

The communication circuitry 218 may be embodied as any communication circuit, device, or collection thereof, capable of enabling communications over a network between the network device 200 and another compute device (e.g., the edge device 110, the edge gateway device 114, the edge resources 150, 152, 154, etc.). The communication circuitry 218 may be configured to use any one or more communication technology (e.g., wired or wireless communications) and associated protocols (e.g., a cellular networking protocol, Wi-Fi®, WiMAX, Ethernet, Bluetooth®, etc.) to effect such communication.

The illustrative communication circuitry 218 includes a network interface controller (MC) 220, which may also be referred to as a host fabric interface (HFI). The MC 220 may be embodied as one or more add-in-boards, daughter cards, network interface cards, controller chips, chipsets, or other devices that may be used by the edge gateway device 114 to connect with another compute device (e.g., the edge device 110, the edge gateway device 114, the edge resources 150, 152, 154, etc.). In some embodiments, the NIC 220 may be embodied as part of a system-on-a-chip (SoC) that includes one or more processors, or included on a multichip package that also contains one or more processors. In some embodiments, the NIC 220 may include a local processor (not shown) and/or a local memory (not shown) that are both local to the NIC 220. In such embodiments, the local processor of the MC 220 may be capable of performing one or more of the functions of the compute engine 210 described herein. Additionally or alternatively, in such embodiments, the local memory of the NIC 220 may be integrated into one or more components of the network device 200 at the board level, socket level, chip level, and/or other levels. Illustratively, the NIC 220 includes a load balancer logic unit 221, which is representative of the load balancer logic unit 136, 138, 140 described relative to FIG. 1.

The one or more illustrative data storage devices 222 may be embodied as any type of devices configured for short-term or long-term storage of data such as, for example, memory devices and circuits, memory cards, hard disk drives, solid-state drives, or other data storage devices. Each data storage device 222 may include a system partition that stores data and firmware code for the data storage device 222. Each data storage device 222 may also include one or more operating system partitions that store data files and executables for operating systems.

Each accelerator device(s) 224 may be embodied as any device(s) or circuitries configured to execute a set of operations (e.g., machine learning and artificial intelligence (AI) operations) faster than the processor 212 is capable of executing the operations. The accelerator device(s) 224 may include one or more field programmable gate arrays (FPGAs) 230, each of which may be embodied as a set (e.g., a matrix) of logic gates that can be configured to perform a set of operations according to a defined configuration (e.g., a bit stream). The accelerator device(s) 224 may additionally or alternatively include a graphics processing unit (GPU) 232, which may be embodied as any device or circuitry (e.g., a programmable logic chip, a processor, etc.) configured to perform graphics-related computations (e.g., matrix multiplication, vector operations, etc.). Additionally or alternatively, the accelerator device(s) 224 may include a vision processing unit (VPU) 234, which may be embodied as any device or circuitry (e.g., a programmable logic chip, a processor, etc.) configured to perform operations related to machine vision.

The edge resources 150, 152, 154 (e.g., the compute devices 160, 162, 164, 166, 168, 170), the edge device 110, the edge gateway device 114, the fog nodes 180, and the core data center 190 may have components similar to those described in FIG. 2 with reference to the network device 200. The description of those components of the network device 200 is equally applicable to the description of components of the edge resources 150, 152, 154 (e.g., the compute devices 160, 162, 164, 166, 168, 170), the edge device 110, the edge gateway device 114, the fog nodes 180, and the core data center 190, with the exception that, in some embodiments, the agent logic unit 213 is not included in devices other than the network device 200. Further, it should be appreciated that any of the edge resources 150, 152, 154 (e.g., the compute devices 160, 162, 164, 166, 168, 170), the edge device 110, the edge gateway device 114, the fog nodes 180, and the core data center 190 may include other components, sub-components, and devices commonly found in a computing device, which are not discussed above in reference to the network device 200 and not discussed herein for clarity of the description. Further, it should be understood that one or more components of a compute device may be distributed across any distance, and are not necessarily housed in the same physical unit.

The network device 200 (or the network devices 130, 132, 134), edge gateway device 114, edge resources 150, 152, 154 (e.g., the compute devices 160, 162, 164, 166, 168, 170), the edge device 110, the fog nodes 180, and the core data center 190 are illustratively in communication via a network, which may be embodied as any type of wired or wireless communication network, or hybrids and combinations thereof, including global networks (e.g., the Internet), local area networks (LANs) or wide area networks (WANs), an edge network, a fog network, cellular networks (e.g., Global System for Mobile Communications (GSM), 3G, Long Term Evolution (LTE), Worldwide Interoperability for Microwave Access (WiMAX), etc.), a radio access network (RAN), digital subscriber line (DSL) networks, cable networks (e.g., coaxial networks, fiber networks, etc.), or any combination thereof.

Figure 3:
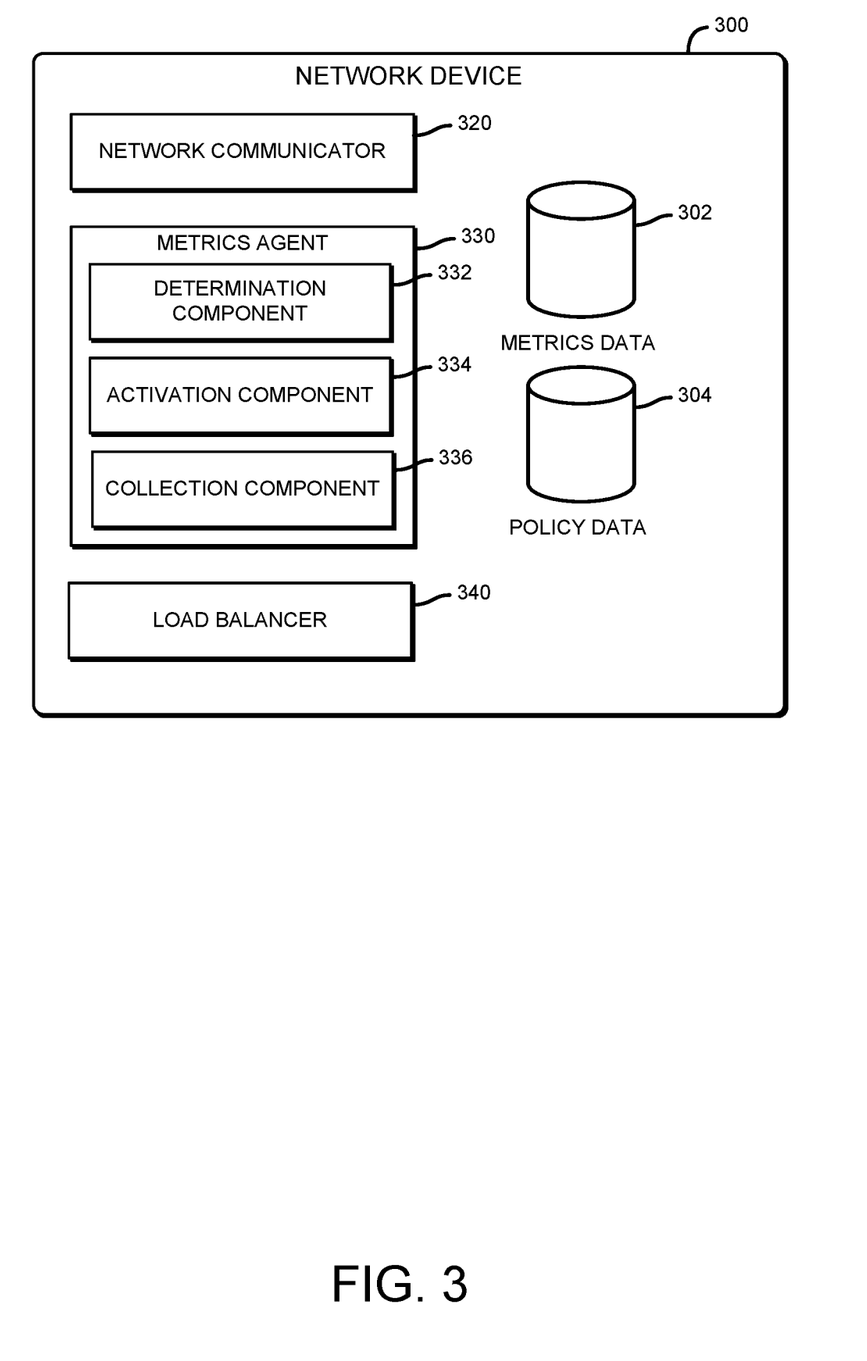
FIG. 3 is a simplified block diagram of at least one embodiment of an environment that may be established by the network device of FIGS. 1 and 2.

Referring now to FIG. 3, the network device 200 may establish an environment 300 during operation. The illustrative environment 300 includes a network communicator 320, a metrics agent 330, and a load balancer 340. Each of the components of the environment 300 may be embodied as hardware, firmware, software, or a combination thereof. In some embodiments, one or more of the components of the environment 300 may be embodied as circuitry or a collection of electrical devices (e.g., network communicator circuitry 320, metrics agent circuitry 330, load balancer circuitry 340, etc.). It should be appreciated that, in such embodiments, one or more of the network communicator circuitry 320 or metrics agent circuitry 330 may form a portion of the agent logic unit 213 (or other components of the network device 200). It should further be appreciated that, in such embodiments, one or more of the network communicator circuitry 320 or load balancer circuitry 340 may form a portion of the load balancer logic unit 221 (or other components of the network device 200).

The environment 300 also includes metrics data 302, which may be embodied as any data indicative of usage metrics associated with processing resources (e.g., CPU resources, accelerator resources, memory resources, and the like) that are collected by the metrics agent 330. The metrics can include processing queue data, cache information, bandwidth, throughput, and so on. The environment 300 also includes policy data 304, which may be embodied as any data indicative of load balancing policies, service level agreement policies, quality of service requirements, security policies, and the like.

In the illustrative embodiment, the network communicator 320, which may be embodied as hardware, firmware, software, virtualized hardware, emulated architecture, and/or a combination thereof as discussed above, is configured to facilitate inbound and outbound network communications (e.g., network traffic, network packets, network flows, etc.) to and from the devices in the system 100. To do so, the network communicator 320 is configured to receive and process data packets from one system or computing device (e.g., the edge gateway device 114) and to prepare and send data packets to another computing device or system (e.g., the edge resources 150, 152, 154). Accordingly, in some embodiments, at least a portion of the functionality of the network communicator 320 may be performed by the communication circuitry 218, and, in the illustrative embodiment, by the NIC 220.

In the illustrative embodiment, the metrics agent 330 is configured to perform the operations described herein, including receiving a request to provide one or more metrics associated with a processing resource over a specified time window, obtain the one or more metrics from the processing resource for the specified time window, and to provide the obtained metrics in response to the request. To do so, the metrics agent 330 includes a determination component 332, an activation component 334, and a collection component 336.

The determination component 332 is configured to evaluate a request sent by an entity to provide metrics data 302 of edge resources (e.g., provided within a given service provider), e.g., the load balancer 340 or some other service (e.g., a health management service for determining the health of edge resources in the system 100). The determination component 332 may identify a usage context based on the request. The determination component 332 may evaluate the usage context to determine which metrics should be collected from the edge resources. Particularly, the determination component 332 may determine a subset of metrics to improve performance in instances in which a large amount (e.g., thousands) of metrics can be collected. The usage context may be based, e.g., on the origin of the request (such as whether the request originates from the load balancer), one or more of the policies provided by the policy data 304, the length of the time window, and the like.

The activation component 334 is configured to identify performance counters on processing resources associated with the metrics to be obtained. Further, the activation component 334 is configured to enable the performance counters. For example, to do so, the activation component 334 may invoke an application programming interface (API) function to an interface associated with the processing resource (e.g., of one of the compute devices in the system 100) to cause the performance counters thereon to capture the corresponding metric data for a period of time specified by the time window in the received request. The activation component 334 is also to initialize buffers on the network device 200 to maintain obtained metrics (e.g., as the metrics data 302). The activation component 334 may also deactivate the performance counters. For instance, the activation component 334 may do so proactively (e.g., after metrics satisfying a request are captured) or when collection for the time window is complete (e.g., at expiration of the time period specified for the window).

The collection component 336 is configured to obtain usage metrics associated with one or more processing resources. In some embodiments, the collection component 336 may retrieve the metrics from a location provided by a given compute device associated with a processing resource.

The collection component 336 may also receive the metrics from the compute device. The collection component 336 may assign information to the received metrics, such as a flow identifier, processing resource identifier, compute device identifier, and timestamp information. In addition, the collection component 336 may store the metrics in a buffer or repository (as metrics data 302) for subsequent retrieval (e.g., by the load balancer 340, by machine learning/artificial intelligence elements). In other embodiments, the collection component 336 transmits the metrics to the requesting entity (e.g., the load balancer 340, a health management service, etc.).

The illustrative load balancer 340 is configured to receive requests from the edge gateway device 114 (or application) for accessing edge resources to perform processing tasks. The load balancer 340 may apply one or more load balancing policies (e.g., of the policy data 304) to the requests to determine an appropriate destination for the request. Further, the load balancer 340 evaluates metrics data 302 to further determine the appropriate destination, e.g., to determine which of the edge resources may, based on an evaluation of the metrics data 302, be available to service the request according to a given SLA.

Figure 4:
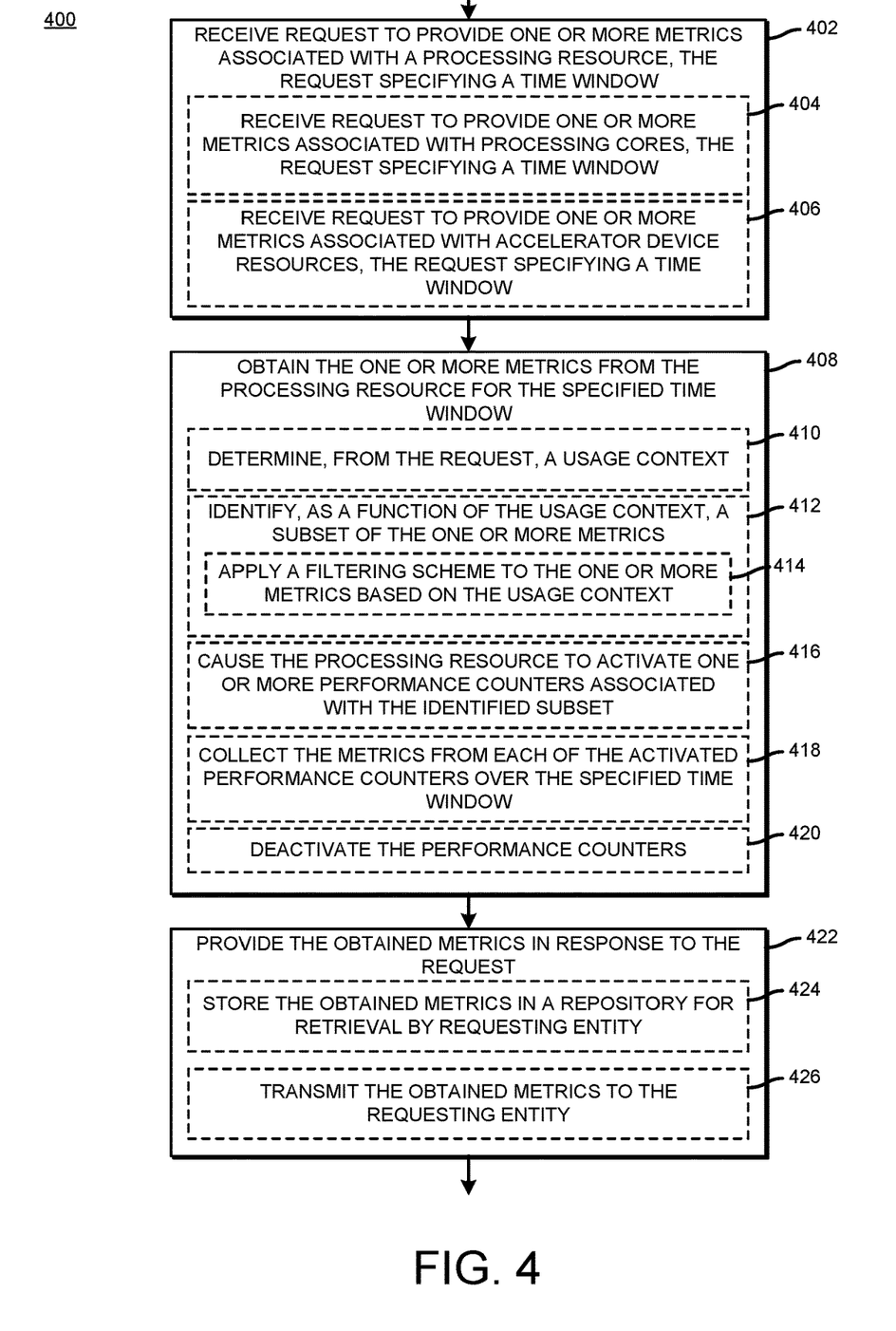
FIG. 4 is a simplified flow diagram of at least one embodiment of a method that may be performed by the network device of FIGS. 1 and 2 for collecting metrics associated with a processing resource as a function of time.

Referring now to FIG. 4, the network device 200, in operation, may execute a method 400 for collecting metrics associated with one or more processing resources as a function of time. As shown, the method 400 begins in block 402, in which the network device 200 receives a request to provide one or more metrics associated with a processing resource, in which the request also specifies a time window for which the metrics are to be collected. For example, in block 404, the network device 200 may receive the request for metrics that are associated with one or more (CPU) processing cores for a specified time window. As another example, in block 406, the network device 200 may receive a request to provide one or more metrics associated with accelerator device resources (e.g., FPGA resources, ASIC resources, etc.) for a specified time window. Other examples include memory resources, network resources, and the like. Further, as another example, the request may also include a request for attestation of a telemetry collection subsystem (e.g., the components used to collect metrics associated with the one or more processing resources). The telemetry collection subsystem may include cryptographic keys used to secure the telemetry data. Further still, attestation data may be included with the telemetry data. In such a case, the telemetry data and attestation assertions are protected using an attestation key, e.g., via a secure enclave or a trusted platform module that includes a device ID and/or an attestation key. A receiver of the telemetry data may verify an attestation assertion and attestation key before acting on the telemetry (e.g., to prevent actions performed on spoofed or falsified data).

In block 408, the network device 200 obtains the one or more metrics from the specified processing resources for the specified time window. For instance, to do so, in block 410, the network device 200 determines, from the request, a usage context. The usage context may be used to determine which metrics to collect from the processing resources. Further, the usage context may be determined as a function of the type of request, the origin of the request, services being accessed by an incoming workload, flow characteristics, and the like. In block 412, the network device 200 identifies, as a function of the usage context, a subset of the one or more metrics to collect. To do so, the network device 200 may apply a filtering scheme to the one or more metrics based on the usage context. An example filtering scheme may identify metric types relating to the usage context and remove from consideration all other metrics available for collection. In block 416, the network device 200 causes the processing resource to activate one or more performance counters associated with each metric in the identified subset of metrics. While active, in block 418, the network device 200 collects the metrics from each of the activated performance counters over the specified time window. In block 420, the network device 200 deactivates the performance counters.

In block 422, the network device 200 provides the obtained metrics in response to the request. For example, to do so, in block 424, the network device 200 stores the obtained metrics in a repository (or other storage) for retrieval by the requesting entity (e.g., a service such as a load balancer, which evaluates the metrics to determine an edge resource to forward a service request to). As another example, in block 426, the network device 200 may transmit the obtained metrics to the requesting entity.

Figure 5:
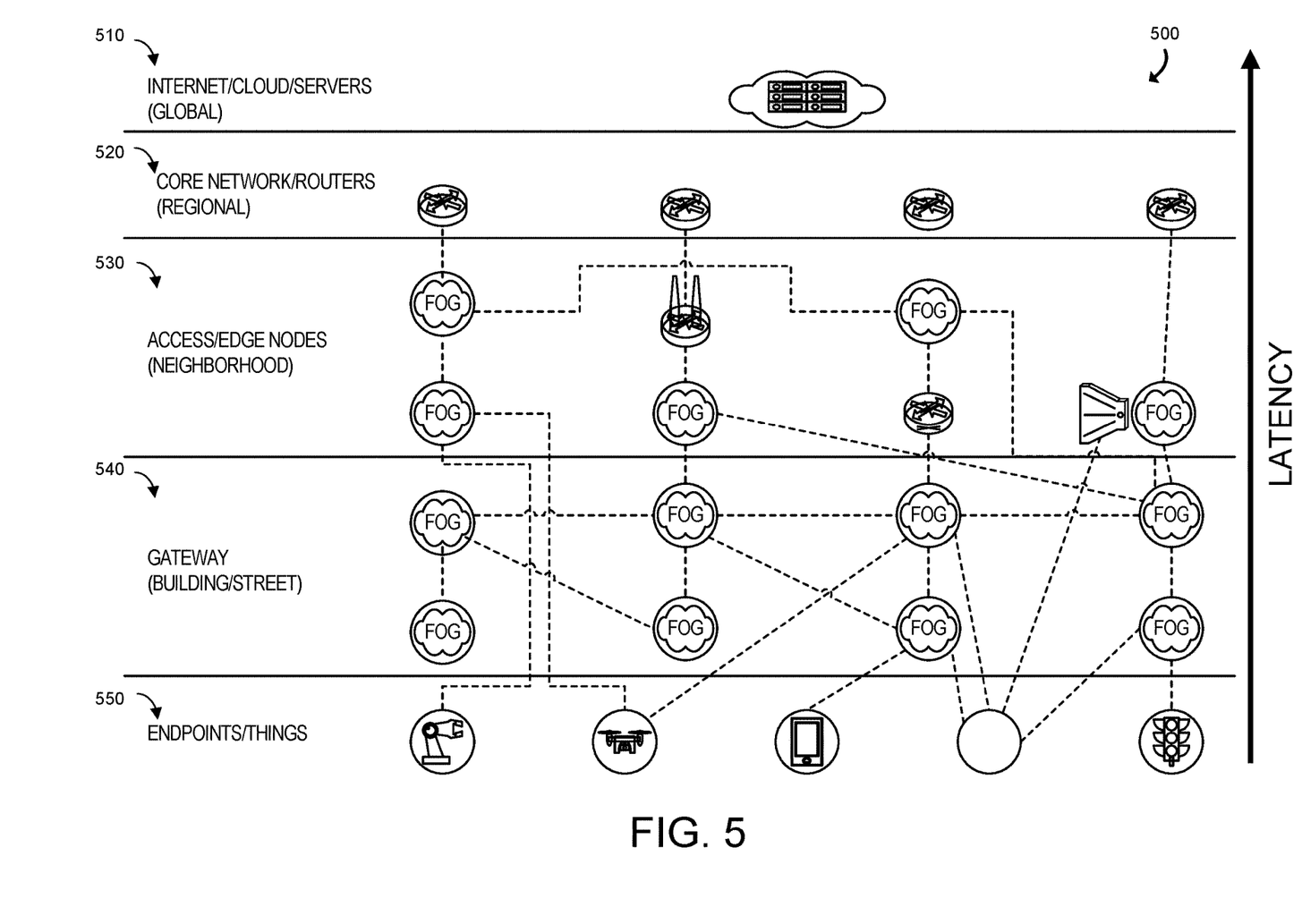
FIG. 5 is a simplified block diagram of a fog and mobile edge computing (MEC) network topology that may be utilized with the system of FIG. 1.

Referring briefly to FIG. 5, a MEC and fog network topology 500 is shown. The network topology 500 includes endpoints (at an endpoints/things network layer 550), gateways (at a gateway layer 540), access or edge computing nodes (e.g., at neighborhood nodes layer 530), core network or routers (e.g., at a regional or central office layer 520). A fog network (e.g., established at the gateway layer 540) may represent a dense geographical distribution of near-user edge devices (e.g., fog nodes), equipped with storage capabilities (e.g., to avoid the need to store data in cloud data centers), communication capabilities (e.g., rather than routed over an internet backbone), control capabilities, configuration capabilities, measurement and management capabilities (rather than controlled primarily by network gateways such as those in an LTE or 5G core network), among others. In this context, FIG. 5 illustrates a general architecture that integrates a number of MEC and fog nodes—categorized in different layers (based on their position, connectivity and processing capabilities, etc.). It will be understood, however, that such fog nodes may be replaced or augmented by edge computing processing nodes.

Fog nodes may be categorized depending on the topology and the layer where they are located. In contrast, from a MEC standard perspective, each fog node may be considered as a mobile edge (ME) Host, or a simple entity hosting a ME app and a light-weighted ME Platform. In an example, a MEC or fog node may be defined as an application instance, connected to or running on a device (ME Host) that is hosting a ME Platform. As such, the application may consume MEC services and be associated to a ME Host in the system. The nodes may be migrated, associated to different ME Hosts, or consume MEC services from other (e.g., local or remote) ME platforms.

In contrast to using the edge, as described above, a traditional application may rely on remote cloud data storage and processing to exchange and coordinate information. A cloud data arrangement allows for long-term data collection and storage, but is not optimal for highly time varying data and may fail in attempting to meet latency challenges (e.g., stopping a vehicle when a child runs into the street). The use of the edge resources as described above enable providing services (e.g., execution of functions) in a low-latency manner, and, in some embodiments, may utilize features in existing MEC services that provide minimal overhead.

In addition to the MEC implementation described above, it should be appreciated that the foregoing systems and methods may implemented in any environment (e.g., smart factories, smart cities, smart buildings, and the like) in which the devices are arranged and interoperate in a manner similar to that described with reference to FIG. 1, though the names of the individual devices may differ from one implementation to the next. For example, in a smart factory, the above systems and methods may improve the accuracy, efficiency, and/or safety with which one or more manufacturing operations are performed, particularly in instances in which the operations are to be performed in real time or near real time (e.g., in which low latency is of high importance). In a smart city, the above systems and methods may improve the accuracy, efficiency, and/or safety in the operation of traffic control systems, environmental monitoring systems, and/or other automated or semi-automated systems. Likewise, in a smart building, the above disclosure may applied to improve the operations of any systems that rely on sensors to collect and act upon the collected information (e.g., threat detection and evacuation management systems, video monitoring systems, elevator control systems, etc.).

EXAMPLES

Illustrative examples of the technologies disclosed herein are provided below. An embodiment of the technologies may include any one or more, and any combination of, the examples described below.

Example 1 includes a network device comprising circuitry to receive, in an edge network, a request to provide one or more metrics associated with a processing resource, the request specifying a window indicative of a time period to capture the one or more metrics; obtain the one or more metrics from the processing resource for the specified window; and provide the obtained one or more metrics in response to the request.

Example 2 includes the subject matter of Example 1, and wherein to receive the request to provide the one or more metrics comprises to receive a request to provide one or more metrics associated with a plurality of processing cores, the request specifying the window indicative of the time period to capture the one or more metrics.

Example 3 includes the subject matter of any of Examples 1 and 2, and wherein to receive the request to provide the one or more metrics comprises to receive a request to provide one or more metrics associated with a plurality of accelerator devices, the request specifying the window indicative of the time period to capture the one or more metrics.

Example 4 includes the subject matter of any of Examples 1-3, and wherein to obtain the one or more metrics from the processing resource comprises to determine, from the request, a usage context indicative of a use for the obtained one or more metrics.

Example 5 includes the subject matter of any of Examples 1-4, and wherein to obtain the one or more metrics from the processing resource further comprises to identify, as a function of the usage context, a subset of the one or more metrics.

Example 6 includes the subject matter of any of Examples 1-5, and wherein to identify, as a function of the usage context, the subset of the one or metrics comprises to apply a filtering scheme to the one or more metrics specified in the request based on the usage context.

Example 7 includes the subject matter of any of Examples 1-6, and wherein to obtain the one or more metrics from the processing resource further comprises to cause the processing resource to activate one or more performance counters associated with each metric in the identified subset; and collect the metrics from each of the activated performance counters over the specified window.

Example 8 includes the subject matter of any of Examples 1-7, and wherein to obtain the one or more metrics from the processing resource further comprises to deactivate each of the performance counters in response to one or more events.

Example 9 includes the subject matter of any of Examples 1-8, and wherein to provide the obtained metrics in response to the request comprises to store the obtained metrics in a repository for retrieval by one or more machine learning elements.

Example 10 includes the subject matter of any of Examples 1-9, and wherein to provide the obtained metrics in response to the request comprises to transmit the obtained metrics in response to the request.

Example 11 includes one or more machine-readable storage media storing instructions, which, when executed on one or more processors, causes a network device to receive, in an edge network, a request to provide one or more metrics associated with a processing resource, the request specifying a window indicative of a time period to capture the one or more metrics; obtain the one or more metrics from the processing resource for the specified window; and provide the obtained one or more metrics in response to the request.

Example 12 includes the subject matter of Example 11, and wherein to receive the request to provide the one or more metrics comprises to receive a request to provide one or more metrics associated with a plurality of processing cores, the request specifying the window indicative of the time period to capture the one or more metrics.

Example 13 includes the subject matter of any of Examples 11 and 12, and wherein to receive the request to provide the one or more metrics comprises to receive a request to provide one or more metrics associated with a plurality of accelerator devices, the request specifying the window indicative of the time period to capture the one or more metrics.

Example 14 includes the subject matter of any of Examples 11-13, and wherein to obtain the one or more metrics from the processing resource comprises to determine, from the request, a usage context indicative of a use for the obtained one or more metrics.

Example 15 includes the subject matter of any of Examples 11-14, and wherein to obtain the one or more metrics from the processing resource further comprises to identify, as a function of the usage context, a subset of the one or more metrics.

Example 16 includes the subject matter of any of Examples 11-15, and wherein to identify, as a function of the usage context, the subset of the one or metrics comprises to apply a filtering scheme to the one or more metrics specified in the request based on the usage context.

Example 17 includes the subject matter of any of Examples 11-16, and wherein to obtain the one or more metrics from the processing resource further comprises to cause the processing resource to activate one or more performance counters associated with each metric in the identified subset; collect the metrics from each of the activated performance counters over the specified time window; and deactivate each of the performance counters.

Example 18 includes the subject matter of any of Examples 11-17, and wherein to provide the obtained metrics in response to the request comprises to store the obtained metrics in a repository for retrieval.

Example 19 includes the subject matter of any of Examples 11-18, and wherein to provide the obtained metrics in response to the request comprises to transmit the obtained metrics in response to the request.

Example 20 includes a network device, comprising circuitry for receiving, in an edge network, a request to provide one or more metrics associated with a processing resource, the request specifying a window indicative of a time period to capture the one or more metrics; means for obtaining the one or more metrics from the processing resource for the specified window; and circuitry for providing the obtained one or more metrics in response to the request.

What is claimed is:

1. A network device comprising:
   network communicator circuitry;
   instructions; and
   programmable circuitry to be programmed by the instructions to:
      access a request to provide one or more metrics associated with one or more compute devices of an edge resource and to provide an attestation of a telemetry collection subsystem, the request to specify a window indicative of a time period to capture the one or more metrics;
      make a determination of one or more metric types to collect, the one or more metric types relevant to a function of an entity that provided the request;
      obtain at least one of the one or more metrics from the telemetry collection subsystem based on the one or more metric types; and
      obtain an attestation assertion pertaining to the at least one of the one or more metrics from the telemetry collection subsystem, the attestation assertion and the at least one of the one or more metrics protected by an attestation key.

2. The network device of claim 1, wherein the programmable circuitry includes at least one of a field programmable gate array, a processor, a graphics processing unit, or a vision processing unit.

3. The network device of claim 1, wherein the function is a load balancing function, the network communicator circuitry to receive, from an edge device, a second request for a processing task, the load balancing function to assign the processing task to at least one of the one or more compute devices based on the at least one of the one or more metrics.

4. The network device of claim 1, wherein the programmable circuitry is to cause the one or more compute devices of the edge resource to enable at least one performance counter to collect the one or more metrics for the time period.

5. The network device of claim 1, wherein to obtain the at least one of the one or more metrics, the programmable circuitry is to:
   determine a usage context of the request; and
   identify the at least one of the one or more metrics based on the usage context.

6. The network device of claim 5, wherein the programmable circuitry is to apply a filtering scheme to the one or more metrics based on the usage context, the filtering scheme to remove any of the one or more metrics from consideration based on ones of the one or more metric types that are not related to the usage context.

7. The network device of claim 6, wherein the programmable circuitry is to:
   after the applying of the filtering scheme, identify a subset of the one or more metrics that are not related to the usage context; and
   remove the subset of the one or more metrics from consideration prior to obtaining the one or more metrics.

8. The network device of claim 5, wherein the programmable circuitry is to cause the one or more compute devices of the edge resource to activate one or more performance counters corresponding to the at least one of the one or more metrics.

9. The network device of claim 1, wherein the programmable circuitry is to provide the at least one of the one or more metrics to the entity associated with the request.

10. The network device of claim 1, wherein the one or more metrics are at least one of processing queue data or cache information, the cache information to include a count of cache hits and a count of cache misses.

11. The network device of claim 1, wherein the one or more metrics are at least one of bandwidth or throughput.

12. The network device of claim 1, wherein the request is to provide one or more second metrics associated with an accelerator device resource.

13. A non-transitory computer-readable medium comprising instructions to cause at least one processor circuit to at least:
- access one or more requests, at least one of the one or more requests to provide one or more metrics associated with one or more compute devices of an edge resource, at least one of the one or more requests to provide an attestation of a telemetry collection system, and at least one of the one or more requests to specify a time period to capture the one or more metrics;
- make a determination of one or more metric types to collect, the one or more metric types relevant to a function of an entity that provided the request one or more requests;
- obtain at least one of the one or more metrics from the telemetry collection system based on the one or more metric types; and
- obtain an attestation assertion pertaining to the at least one of the one or more metrics from the telemetry collection system, the attestation assertion and the at least one of the one or more metrics protected by at least one attestation key.

14. The non-transitory computer-readable medium of claim 13, wherein the instructions are to cause one or more of the at least one processor circuit to provide the at least one of the one or more metrics to the entity.

15. The non-transitory computer-readable medium of claim 13, wherein the one or more requests is to provide one or more second metrics associated with an accelerator device resource.

16. The non-transitory computer-readable medium of claim 13, wherein the instructions are to cause one or more of the at least one processor circuit to cause the one or more compute devices of the edge resource to enable at least one performance counter to collect the one or more metrics for the time period.

17. The non-transitory computer-readable medium of claim 13, wherein to obtain the one or more metrics, the instructions are to cause one or more of the at least one processor circuit to:
- determine a usage context of the one or more requests; and
- identify the at least one of the one or more metrics based on the usage context.

18. The non-transitory computer-readable medium of claim 17, wherein the instructions are to cause one or more of the at least one processor circuit to apply a filtering scheme to the one or more metrics based on the usage context, the filtering scheme to remove any of the one or more metrics from consideration based on at least one of the metric types that is not related to the usage context.

19. The non-transitory computer-readable medium of claim 17, wherein the instructions are to cause one or more of the at least one processor circuit to cause the one or more compute devices of the edge resource to activate one or more performance counters corresponding to the at least one of the one or more metrics.

20. A method comprising:
- accessing, by executing an instruction with programmable circuitry, one or more requests, at least one of the one or more requests to provide one or more metrics associated with one or more compute devices of an edge resource, at least one of the one or more requests to provide an attestation of a telemetry collection system, and at least one of the one or more requests to specify a time period to capture the one or more metrics;
- making, by executing an instruction with the programmable circuitry, a determination of one or more metric types to collect, the one or more metric types relevant to a function of an entity that provided the one or more requests;
- obtaining, by executing an instruction with the programmable circuitry, at least one of the one or more metrics from the telemetry collection system based on the one or more metric types; and
- obtaining, by executing an instruction with the programmable circuitry, an attestation assertion pertaining to the at least one of the one or more metrics from the telemetry collection system, the attestation assertion and the at least one of the one or more metrics protected by an attestation key.

21. The method of claim 20, further including causing the one or more compute devices of the edge resource to enable at least one performance counter to collect the one or more metrics for the time period.

22. The method of claim 20, wherein the obtaining of the at least one of the one or more metrics includes:
- determining a usage context of the one or more requests; and
- identifying the at least one of the one or more metrics based on the usage context.

23. The method of claim 22, further including applying a filtering scheme to the one or more metrics based on the usage context, the filtering scheme to remove any of the one or more metrics from consideration based on at least one of the metric types that is not related to the usage context.

24. The method of claim 23, further including:
- after the applying of the filtering scheme, identifying a subset of the one or more metrics that are not related to the usage context; and
- removing the subset of the one or more metrics from consideration prior to the obtaining of the at least one of the one or more metrics.

25. The method of claim 22, further including causing the one or more compute devices of the edge resource to activate one or more performance counters corresponding to the at least one of the one or more metrics.

26. The method of claim 20, further including providing the at least one of the one or more metrics to the entity after the accessing of the one or more requests.

\* \* \* \* \*

UNITED STATES PATENT AND TRADEMARK OFFICE
CERTIFICATE OF CORRECTION

PATENT NO. : 12,177,099 B2
APPLICATION NO. : 17/579382
DATED : December 24, 2024
INVENTOR(S) : Raghu Kondapalli et al.

Page 1 of 1

It is certified that error appears in the above-identified patent and that said Letters Patent is hereby corrected as shown below:

In the Claims

Column 15, Claim 13, Line 30, Delete "request".

Signed and Sealed this
Eleventh Day of February, 2025

Coke Morgan Stewart
*Acting Director of the United States Patent and Trademark Office*